United States Patent
Coyle

(10) Patent No.: US 9,087,250 B2
(45) Date of Patent: *Jul. 21, 2015

(54) CELL PHONE READING MODE USING IMAGE TIMER

(71) Applicant: Honeywell International, Inc., Morristown, NJ (US)

(72) Inventor: Larry Coyle, Weedsport, NY (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/329,303

(22) Filed: Jul. 11, 2014

(65) Prior Publication Data

US 2014/0319220 A1    Oct. 30, 2014

Related U.S. Application Data

(63) Continuation of application No. 13/428,500, filed on Mar. 23, 2012, now Pat. No. 8,777,108.

(51) Int. Cl.
  *G06K 7/10* (2006.01)
  *G06Q 20/32* (2012.01)

(52) U.S. Cl.
  CPC ........ *G06K 7/10752* (2013.01); *G06Q 20/3276* (2013.01)

(58) Field of Classification Search
  USPC .............. 235/462.15, 462.18, 462.2, 462.24, 235/462.41
  See application file for complete search history.

(56) References Cited

U.S. PATENT DOCUMENTS

| | | |
|---|---|---|
| 5,019,699 A | 5/1991 | Koenck |
| 5,406,062 A | 4/1995 | Hasegawa et al. |
| 5,504,367 A | 4/1996 | Arackellian et al. |
| 5,541,419 A | 7/1996 | Arackellian |
| 5,572,006 A | 11/1996 | Wang et al. |
| 5,576,529 A | 11/1996 | Koenck et al. |
| 5,591,955 A | 1/1997 | Laser |
| 5,646,390 A | 7/1997 | Wang et al. |
| 5,648,650 A | 7/1997 | Sugifune et al. |
| 5,701,001 A | 12/1997 | Sugifune et al. |
| 5,756,981 A | 5/1998 | Roustaei et al. |
| 5,784,102 A | 7/1998 | Hussey et al. |
| 5,815,200 A | 9/1998 | Ju et al. |
| 5,877,487 A | 3/1999 | Tani et al. |
| 5,886,338 A | 3/1999 | Arackellian et al. |
| 6,010,070 A | 1/2000 | Mizuochi et al. |
| 6,230,975 B1 | 5/2001 | Colley et al. |
| 6,254,003 B1 | 7/2001 | Pettinelli et al. |
| 6,283,374 B1 | 9/2001 | Fantone et al. |
| 6,347,163 B2 | 2/2002 | Roustaei |
| 6,412,700 B1 | 7/2002 | Blake et al. |
| 6,669,093 B1 | 12/2003 | Meyerson et al. |
| 6,695,209 B1 | 2/2004 | La |
| 6,749,120 B2 | 6/2004 | Hung et al. |
| 6,832,725 B2 | 12/2004 | Gardiner et al. |
| 6,877,661 B2 | 4/2005 | Webb et al. |

(Continued)

*Primary Examiner* — Kristy A Haupt
(74) *Attorney, Agent, or Firm* — Additon, Higgins & Pendleton, P.A.

(57) ABSTRACT

An system contains an image capture device configured to capture an image. The system includes a lighting and exposure mechanism. The system also includes a camera sensor interface with a stat FIFO. The stat FIFO is configured to receive data from the image capture device. When the stat FIFO, during image scanning, receives a pre-determined amount of image data, it fires an interrupt, which times the lighting and exposure mechanism in the system.

20 Claims, 4 Drawing Sheets

(56) References Cited

U.S. PATENT DOCUMENTS

| | | |
|---|---|---|
| 7,061,395 B1 | 6/2006 | Bromer |
| 7,077,321 B2 | 7/2006 | Longacre, Jr. et al. |
| 7,083,097 B2 | 8/2006 | Toyama et al. |
| 7,083,098 B2 | 8/2006 | Joseph et al. |
| 7,185,817 B2 | 3/2007 | Zhu et al. |
| 7,219,843 B2 | 5/2007 | Havens et al. |
| 7,234,641 B2 | 6/2007 | Olmstead |
| 7,240,844 B2 | 7/2007 | Zhu et al. |
| 7,255,279 B2 | 8/2007 | Zhu et al. |
| 7,270,274 B2 | 9/2007 | Hennick et al. |
| 7,303,126 B2 | 12/2007 | Patel et al. |
| 7,308,375 B2 | 12/2007 | Jensen et al. |
| 7,320,431 B2 | 1/2008 | Zhu et al. |
| 7,336,197 B2 | 2/2008 | Ding et al. |
| 7,357,326 B2 | 4/2008 | Hattersley et al. |
| 7,387,250 B2 | 6/2008 | Muni |
| 7,398,927 B2 | 7/2008 | Olmstead et al. |
| 7,490,778 B2 | 2/2009 | Zhu et al. |
| 7,503,499 B2 | 3/2009 | Zhu et al. |
| 7,513,430 B2 | 4/2009 | Zhu et al. |
| 7,516,899 B2 | 4/2009 | Laser |
| 7,527,207 B2 | 5/2009 | Acosta et al. |
| 7,533,824 B2 | 5/2009 | Hennick et al. |
| 7,568,628 B2 | 8/2009 | Wang et al. |
| 7,611,060 B2 | 11/2009 | Wang et al. |
| 7,656,556 B2 | 2/2010 | Wang |
| 7,693,744 B2 | 4/2010 | Forbes |
| 7,735,737 B2 | 6/2010 | Kotlarsky et al. |
| 7,762,464 B2 | 7/2010 | Goren et al. |
| 7,770,799 B2 | 8/2010 | Wang |
| 7,775,436 B2 | 8/2010 | Knowles et al. |
| 7,780,089 B2 | 8/2010 | Wang |
| 7,809,407 B2 | 10/2010 | Oshima et al. |
| 7,810,720 B2 | 10/2010 | Lovett |
| 7,813,047 B2 | 10/2010 | Wang et al. |
| 7,909,257 B2 | 3/2011 | Wang et al. |
| 7,918,398 B2 | 4/2011 | Li et al. |
| 7,995,178 B2 | 8/2011 | Suguro et al. |
| 8,074,887 B2 | 12/2011 | Havens et al. |
| 8,636,215 B2 | 1/2014 | Ding et al. |
| 8,640,960 B2 | 2/2014 | Wang et al. |
| 8,777,108 B2 * | 7/2014 | Coyle ............... 235/462.15 |
| 2003/0062413 A1 | 4/2003 | Gardiner et al. |
| 2003/0222147 A1 | 12/2003 | Havens et al. |
| 2004/0020990 A1 | 2/2004 | Havens et al. |
| 2004/0164165 A1 | 8/2004 | Havens et al. |
| 2005/0001035 A1 | 1/2005 | Hawley et al. |
| 2005/0023356 A1 | 2/2005 | Wiklof et al. |
| 2005/0103854 A1 | 5/2005 | Zhu et al. |
| 2005/0279836 A1 | 12/2005 | Havens et al. |
| 2006/0011724 A1 | 1/2006 | Joseph et al. |
| 2006/0043194 A1 | 3/2006 | Barkan et al. |
| 2006/0113386 A1 | 6/2006 | Olmstead |
| 2006/0163355 A1 | 7/2006 | Olmstead et al. |
| 2006/0202036 A1 | 9/2006 | Wang et al. |
| 2007/0138293 A1 | 6/2007 | Zhu et al. |
| 2007/0181692 A1 | 8/2007 | Barkan et al. |
| 2007/0284447 A1 | 12/2007 | McQueen |
| 2008/0023556 A1 | 1/2008 | Vinogradov et al. |
| 2008/0223933 A1 | 9/2008 | Smith |
| 2009/0026267 A1 | 1/2009 | Wang et al. |
| 2009/0057413 A1 | 3/2009 | Vinogradov et al. |
| 2009/0072038 A1 | 3/2009 | Li et al. |
| 2009/0140050 A1 | 6/2009 | Liu et al. |
| 2010/0044436 A1 | 2/2010 | Powell et al. |
| 2010/0044440 A1 | 2/2010 | Wang et al. |
| 2010/0078477 A1 | 4/2010 | Wang et al. |
| 2010/0108769 A1 | 5/2010 | Wang et al. |
| 2010/0147956 A1 | 6/2010 | Wang et al. |
| 2011/0163165 A1 | 7/2011 | Liu et al. |
| 2011/0174880 A1 | 7/2011 | Li et al. |
| 2012/0000982 A1 | 1/2012 | Gao et al. |
| 2012/0111944 A1 | 5/2012 | Gao et al. |
| 2012/0138684 A1 | 6/2012 | Van Volkinburg et al. |
| 2012/0153022 A1 | 6/2012 | Havens et al. |
| 2012/0193429 A1 | 8/2012 | Van Volkinburg et al. |
| 2013/0001312 A1 | 1/2013 | Kearney et al. |
| 2013/0146665 A1 | 6/2013 | Havens et al. |
| 2013/0248604 A1 | 9/2013 | Coyle |

* cited by examiner

CELL PHONE READING MODE USING IMAGE TIMER

CROSS-REFERENCE TO RELATED APPLICATION

The present application claims the benefit of U.S. patent application Ser. No. 13/428,500 for a Cell Phone Reading Mode Using Image Timer filed on Mar. 23, 2012 (and published on Sep. 26, 2013 as U.S. Patent Application Publication No. 2013/0248604), now U.S. Pat. No. 8,777,108. Each of the foregoing patent application, patent publication, and patent is incorporated herein by reference in its entirety.

FIELD OF INVENTION

The present invention relates to a system and method of utilizing the image engine of a mobile device to control the timing up lighting and exposure when capturing images, increasing the compatibility of this operation across multiple platforms.

BACKGROUND

A cell phone reading mode allows the capture of images, including images of decodable indicia, including bar codes from mobile devices, including but not limited to mobile phones and personal data terminals (PDTs). The scanning operation, as performed by a mobile device, such as a smart phone, with an integrated image capture device, such as a camera, relies on code in the operating system (OS), installed on the processor of the device. This "reading mode" of the device, i.e., the mode in which images of decodable indicia, such as bar codes, are captured, is accomplished by operating system code, which is executed on the processor. The operating system code times the light-emitting diodes (LEDs) in the display and the aimer, between two different camera frames. The first image frame has a long exposure. This exposure allows a user to read the mobile device display. The lights occur outside the image so that the image, when viewed, does not appear to flicker. The second image frame has a short exposure. This exposure is accomplished with high intensity flash LEDs.

Because reading mode, the lighting and exposure timing for scanning images including images of decodable indicia, is controlled by code in the operating system, this functionality is not flexible. The timing is operating-system specific—it is not compatible across different platforms, and it is not compatible across different devices.

The timing of the light and exposure is also limited by the processor of the mobile device. When the continuous lighting is needed, the ideal control of the LEDs is an asynchronous timer. However, the flexibility is limited because the timing of the LEDs is dependent on the timers on the processor of the mobile device. The dedicated use of this timer for image capture purposes renders this system resource less available and/or unavailable for other processes within a given terminal (e.g., encoded information reading (EIR) terminals configured to read bar codes and/or other types of encoded information). Timers in the hardware layer may be in short supply or already in use by the system for other tasks.

A need exists for a method that controls the reading mode, i.e., times the lighting and exposure, by relocating this functionality to a resource outside of the processor.

SUMMARY

An object of the present invention is to utilize the hardware interface for a camera in an EIR terminal, the camera sensor interface (CSI), to time the lighting and exposure mechanism of an image capture device, including but not limited to LEDs and an aimer, during cell phone reading mode.

Another object of the present invention is to utilize system resources that are not shared with other processes in order to increase the speed and efficiency of cell phone reading mode. These shared resources include, but are not limited to, one or more processors within the EIR terminal, and the timers that clock these processors.

Another object of the present invention is to increase the compatibility of the CSI across multiple operating systems and platforms by locating the controls for cell phone reading mode outside of the operating system.

Rather than rely on timers used by the operating system (OS) that clock the processor to turn the lighting, which includes but is not limited to, LEDs on and off during image capture, the present system and method utilizes the image engine in the EIR terminal to time the exposure and the lighting.

Rather than tie the lighting and exposure activity, which is accomplished is some embodiments of the present invention through LED and aimer activity, to a timer in the processor of the EIR terminal, in an embodiment of the present invention, the timing of LEDs and aimers are controlled by camera interrupts managed by the CSI, and specifically, the statistics FIFO (stat FIFO).

In many EIR terminals, the CSI contains a stat FIFO, which it utilizes to gather data on image quality. The data gathered is not utilized. Rather, the stat FIFO is configured to gather data a pre-determined number of times per image, and fire an interrupt on the system each time it completes it task. In this manner, if the stat FIFO is configured to father 12 times per image, the stat FIFO provides an image progress indicator 12 times during an image frame. These progress indicators assist in exposure calculations because the indicators allow a look at the first part of an image during image capture, which can be used to calculate the next exposure before image capture is complete.

In an embodiment of the present invention, the stat FIFO timing indicator, the interrupts and timing mechanism, are used additionally to time the LED and aimer(s) on/off time in cell phone mode. The stat FIFO provides a pre-defined number of interrupts through each image frame. Specialized interrupts mark the start of frame (SOF) and end of frame (EOF). These camera interrupts supply the timing to turn on and off the LEDs and aimers without using the system timers in the processor, which can be allocated to other processes within the EIR terminal.

The stat FIFO captures image data by blocks. The number of pixels per block to be used for gathering image data and the number of pixels to skip between these blocks are programmable. When the stat FIFO is full, it generates an interrupt to the system. In an embodiment of the present invention, a total of twelve (12) interrupts are created by setting the number of pixels to be gathered and skipped by these blocks to total $\frac{1}{12}$ of the image. This configuration created a "real time" progression in the image capture process.

In an embodiment of the present invention, the computer code that controls the timing of the LEDs and aimers in the EIR terminal is installed as part of the scan driver software; this computer program code is independent from the computer code that provides the OS of the EIR terminal. In an embodiment of the present invention, the computer code, i.e., program code that works in conjunction with the hardware components of the image engine, is executed on a microprocessor within the image engine, as opposed to on a processor shared by other computing resources within the EIR terminal.

In another embodiment of the present invention, this computer program code is executed by the main processor. All or a portion of the computer code can be stored on memory resources within the image engine, EIR terminal, or on an external resource that is accessed by the EIR terminal via a network connection.

Although the present invention has been described in relation to utilizing the stat FIFO to initiate lighting during image capture, many other variations and modifications will become apparent to those skilled in the art, including utilizing a timing device within the CSI to initiate some or all of the lighting requirements of image capture.

DETAILED DESCRIPTION

The present invention provides a system and method for utilizing the stat FIFO in the CSI to time lighting and exposure mechanisms in a device, including but not limited to, the LEDs and aimers in the reading mode of an EIR terminal, including but not limited to a cellular phone or a PDT.

The present invention provides a system and method for utilizing the stat FIFO in the CSI as an image progress indicator instead of just an image data quality collector.

The stat FIFO is part of the CSI, which is a separate peripheral on the processor chip of an EIR terminal. The CSI captures the images from the camera in the EIR terminal. The stat FIFO gathers data on the image being captured. In an embodiment of the present invention, rather than use the processor to gather image data, the stat FIFO generates interrupts to the system to enable the handling of events, in this case, the turning on and off of the lights. The CSI hardware is utilized to control the timing of events that go with image capture, which includes LED and aimer control. Eliminating the processor from this function reserves the resources for other processes.

In this embodiment, the CSI feature of vertical blank timing is used to change the time between frames so that the LEDs do not flicker when using the EIR terminal. Shifting the frame timing renders the lighting more symmetrical, which prevents unwanted flickering when using the EIR terminal. Generally, one frame in cell phone mode has the LEDs on during exposure, and the other has it occurring outside of exposure, so this symmetry is helpful for consistent and efficient illumination.

Figure 1:
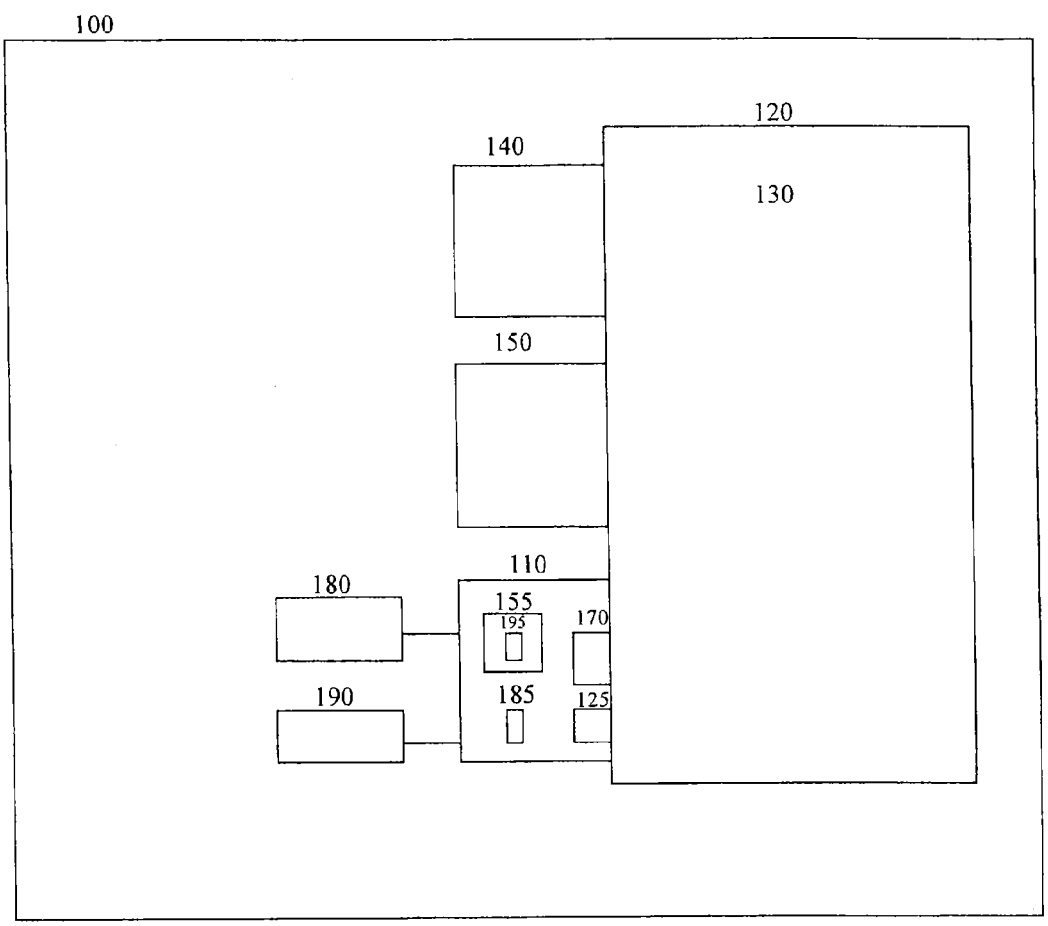
FIG. 1 depicts a technical architecture of an embodiment of the present invention.

In an embodiment of the present invention, the stat FIFO in the CSI of an EIR terminal provides the timing for the LEDs and aimers that are active during image capture. FIG. 1 is an embodiment of an aspect of the present invention. FIG. 1 depicts select structures in the CSI 110 and on the periphery in of an EIR terminal. Although FIG. 1 depicts the lighting and exposure mechanisms of the present invention to be comprised of an LED and an aimer, one of skill in the art will recognize that the configuration of the stat FIFO to control lighting can be accomplished in accordance with the method of the present invention by substituting different lighting and exposure mechanisms.

Although the embodiment of FIG. 1 is specific to an EIR terminal, one of skill in the art will recognize that the functionality of the image engine can be integrated into various devices, including, but not limited to, electronic readers and PDTs.

Referring to FIG. 1, the EIR terminal 100 includes a CSI 110 that includes a stat FIFO 170. The EIR terminal 100 includes a processor 120 with a CPU core 130 and several peripherals built onto the same chip. These peripherals include USB controller 140, at least one memory controller 150, and a CSI 110. The stat FIFO 170, which is part of the CSI 110 gathers data on an image being captured. The stat FIFO 170 does not utilize the processor 120 to capture this data; instead, the stat FIFO 170 generates interrupts to the EIR terminal 100 to enable the turning on and off of the lights, specifically, the LEDs 180 and the aimers 190.

The stat FIFO 170 is configured to supply the timing needed to manage the LED 180 and aimer 190 activity during scanning images, including images of decodable indicia. During image capture, the stat FIFO 170 gathers data on the image being captured.

In this embodiment, when the EIR terminal 100 is utilized to scan an image, the stat FIFO 170 in the CSI 110 provides a pre-defined number of interrupts through each image frame. Specialized interrupts mark the start of frame (SOF) and end of frame (EOF). These camera interrupts supply the timing to turn on and off the LED 180 and aimer 190 without using the system timers in the processor 120, which can be allocated to other processes within the EIR terminal 100.

Referring to FIG. 1, the stat FIFO 170 captures image data by blocks. This feature is programmable, meaning that it can be controlled by program code executes on a resource within the EIR terminal 100 and/or an external resource that accesses the EIR terminal 100. This feature is a programmable for the number of pixels per block to gather image data on, plus the number pixels to skip between these blocks. When the stat FIFO 170 is full, it generates an interrupt to the system. In an embodiment of the present invention, by setting the number of pixels to be gathered and skipped by these blocks to total $\frac{1}{12}$ of the image, twelve (12) interrupts per image, are programmatically specified.

In an embodiment of the present invention, the stat FIFO 170 provides eleven (11) interrupts in each frame. Hence, the stat FIFO 170 splits the image into 12 pieces. One of skill in the art will recognize that the stat FIFO 170 can be configured in further embodiments of the present invention to split image into a different number of objects, including but not limited to eight (8), and/or ten (10). These segments are small enough to provide a sufficient number of interrupts to time the LED 180 and aimer 190 to produce an image of sufficient quality in the scanning process.

Because the interrupts, and therefore the timing of the LED 180 and aimer 190 are controlled by the CSI 110, the illuminations and capture, if ineffective, can be altered without engaging resources in the EIR terminal 100 beyond the CSI 110 itself. After each interrupt, the stat FIFO 170 can evaluate or receive data from another resource of the CSI 110, such as the microprocessor 125 regarding whether the levels are effective, i.e., the data is complete and not incomplete or corrupt. If there is an issue with the data, the light can be adjusted quickly without accessing a timer on the EIR terminal's processor 120. The stat FIFO 170 procedures are flexible because they are limited to the stat FIFO 170 in the CSI 110.

Referring to FIG. 1, the hardware in the CSI 110 controls the timing of events surrounding image capture, including LED 180 and aimer 190 control. The vertical blank timing feature of the CSI 110 is utilized to change the times between frames so that the LED 180 does not flicker when utilizing the EIR terminal 100.

To control the activities of the stat FIFO 170 in the CSI 110, software is located on the scan driver 195, which can be utilized on multiple platforms and across varied devices, including but not limited to eReaders and PDTs. In another embodiment of the present invention, this computer code remains part of the operating system. In this embodiment, while the stat FIFO controls the timing, the code in the operating system directs this timing.

Referring to FIG. 1, this program code, computer code, is part of the scan driver software, as opposed to being part of the OS. By separating this code from device-specific code, such as the OS, the code can be useable across device, platform and OS. In one embodiment of the present invention, this program code is executed by the microprocessor 185 in the CSI 110. Executing this software component within the CSI 110 amasses all the imaging functionality in a component that is device-independent, OS-independent, and platform-independent. Additionally, the execution of the code is not queued by a shared processor, such as the main processor 120 in the EIR terminal 100.

In another embodiment of the present invention, the code is executed by the processor 120. One of skill in the art will recognize that different EIR terminals will contain varied resource for execution of computer code that supports the operations of the CSI hardware.

In an embodiment of the present invention, the program code in the scan driver is installed on a memory resource 155 within the CSI 110. This memory resource 155, which includes but is not limited to RAM, ROM, and/or a database, is accessible via an interface (not pictures), including but not limited to a hardware or a software interface. In further embodiments of the present invention, the program code can be located on a memory resource within the EIR terminal 100, or accessible to the EIR terminal and/or the CSI 110 via a network connection.

Figure 2:
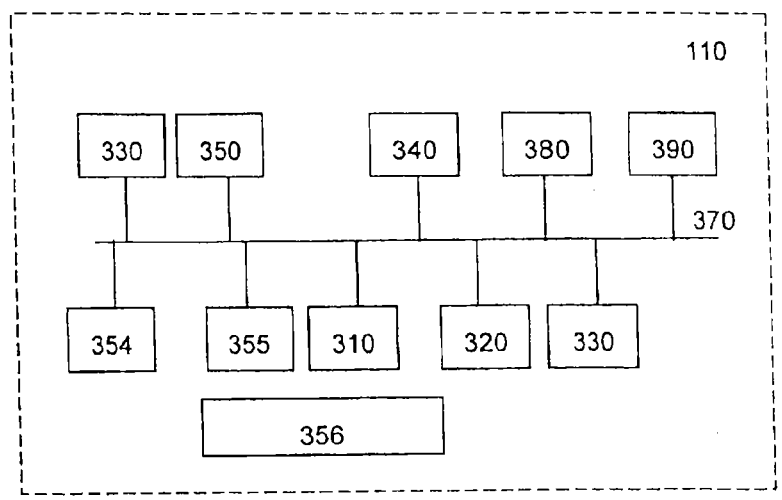
FIG. 2 depicts an embodiment of an aspect of the present invention.

A component-level diagram of one embodiment of an EIR terminal is now being described with references to FIG. 2. EIR terminal 100 can comprise at least one microprocessor 310 and a memory 320, both coupled to the system bus 370. The microprocessor 310 can be provided by a general purpose microprocessor or by a specialized microprocessor (e.g., an ASIC). In one embodiment, EIR terminal 100 can comprise a single microprocessor which can be referred to as a central processing unit (CPU). In another embodiment, EIR terminal 100 can comprise two or more microprocessors, for example, a CPU providing some or most of the EIR terminal functionality and a specialized microprocessor performing some specific functionality. A skilled artisan would appreciate the fact that other schemes of processing tasks distribution among two or more microprocessors are within the scope of this disclosure.

EIR terminal 100 can further comprise a communication interface 340 communicatively coupled to the system bus 370. In one embodiment, the communication interface can be provided by a wireless communication interface. The wireless communication interface can be configured to support, for example, but not limited to, the following protocols: at least one protocol of the IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1xEV-DO protocol family.

EIR terminal 100 can further comprise a keyboard interface 354 and a display adapter 355, both also coupled to the system bus 370. EIR terminal 100 can further comprise a battery 356. In one embodiment, the battery 356 can be provided by a replaceable rechargeable battery pack.

EIR terminal 100 can further comprise a GPS receiver 380. EIR terminal 100 can further comprise at least one connector 390 configured to receive a subscriber identity module (SIM) card.

EIR terminal 100 can further comprise one or more EIR devices 330, provided, for example, but not limited to, by an RFID reading device, a bar code reading device, or a card reading device. In one embodiment, the RFID terminal can be configured to read an encoded message using EIR device 330, and to output raw message data containing the encoded message. In another embodiment, the RFID terminal can be configured to read an encoded message using EIR device 330, and to output decoded message data corresponding to the encoded message. As used herein, "message" is intended to denote a character string comprising alphanumeric and/or non-alphanumeric characters. An encoded message can be used to convey information, such as identification of the source and the model of a product, for example, in a UPC code.

The EIR device 330 may be a camera where the integration hardware includes a CSI available to capture image data that is capable of image processing in the hardware and/or the software. Included in the CSI is often a stat FIFO, which, as aforementioned, is used to gather data on image quality, and in an embodiment of the present invention, is additionally used to control the timing of the lighting for image capture, including but not limited to LEDs and aimers.

Of course, devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is a device that read bar codes for purposes of this disclosure.

Figure 3:
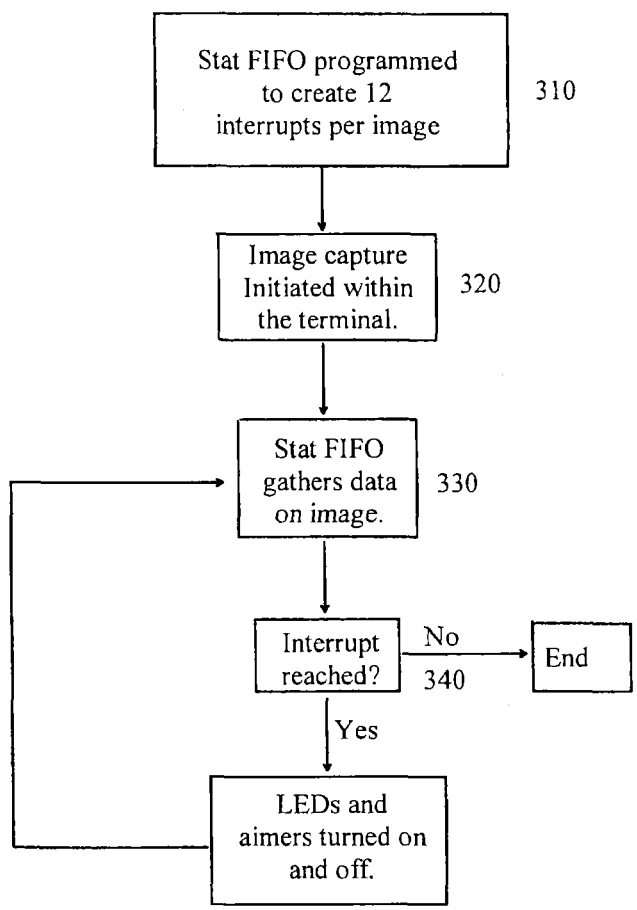
FIG. 3 depicts a workflow of an embodiment of the present invention.

FIG. 3 is a workflow 300 that can be utilized by an embodiment of the present invention. First, the stat FIFO in the CSI is programmed to create twelve (12) interrupts per image 310, which will time the LED and aimer(s) in cell phone reading mode. These specialized interrupts mark the start of frame (SOF) and end of frame (EOF). Then, image capture is initiated within the terminal 320. The stat FIFO gathers data on the image being captured 330. Each time an interrupt is reached 340, the interrupt supplies the timing to turn on and off the LEDs and aimers 350. An interrupt is reached each time a pre-defined block is full, per the number of pixels that were programmatically allocated to the block.

Figure 4:
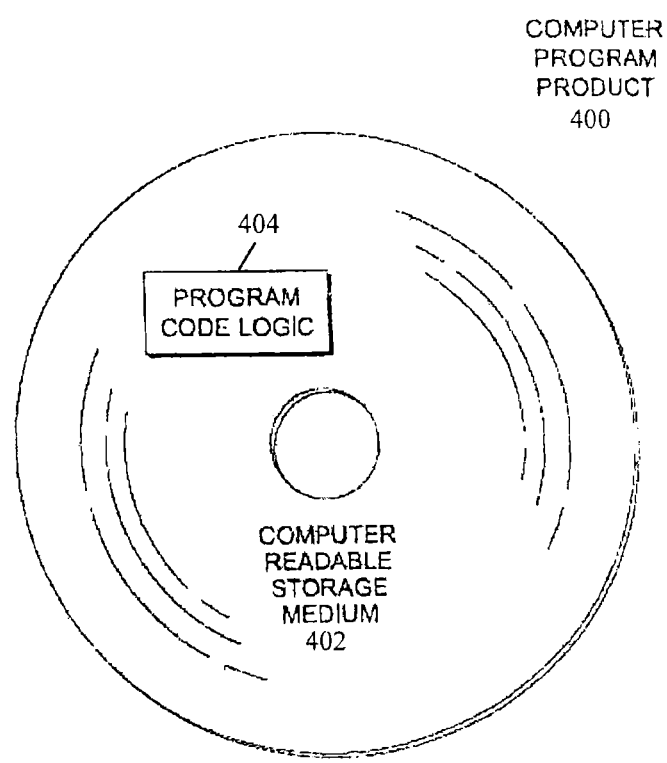
FIG. 4 depicts a computer program product incorporating one or more aspects of the present invention.

Computer-readable code or instructions need not reside on the enumerated computer systems processor 120 within the EIR terminal of FIG. 1. Referring to FIG. 4, in one example, a computer program product 400 includes, for instance, one or more non-transitory computer readable storage media 402 to store computer readable program code means or logic 404 thereon to provide and facilitate one or more aspects of the present invention.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language, assembler or similar programming languages. The program code may execute entirely on one resource of a data processing and storage system, such as a cloud, partly on various resources, and/or partly on the EIR terminal and partly on one or more resources of the data processing and storage system.

One or more aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In addition to the above, one or more aspects of the present invention may be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider may receive payment from the customer under a subscription and/or fee agreement, as examples. Additionally or alternatively, the service provider may receive payment from the sale of advertising content to one or more third parties.

In one aspect of the present invention, an application may be deployed for performing one or more aspects of the present invention. As one example, the deploying of an application comprises providing computer infrastructure operable to perform one or more aspects of the present invention.

As a further aspect of the present invention, a computing infrastructure may be deployed comprising integrating computer readable code into a computing system, in which the code in combination with the computing system is capable of performing one or more aspects of the present invention.

As yet a further aspect of the present invention, a process for integrating computing infrastructure comprising integrating computer readable code into a computer system may be provided. The computer system comprises a computer readable medium, in which the computer medium comprises one or more aspects of the present invention. The code in combination with the computer system is capable of performing one or more aspects of the present invention.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

Although the present invention has been described in relation to particular embodiments thereof, many other variations and modifications will become apparent to those skilled in the art. As such, it will be readily evident to one of skill in the art based on the detailed description of the presently preferred embodiment of the system and method explained herein, that different embodiments can be realized.

The invention claimed is:

1. A system, comprising:
an image capture device configured to capture an image and transmit image data, the image capture device comprising a lighting and exposure mechanism; and
a camera sensor interface configured to receive image data from the image capture device, the camera sensor interface comprising a stat FIFO;
wherein the stat FIFO is configured to:
receive image data from the image capture device; and
responsive to receiving a pre-determined portion of the image data, send an interrupt to the lighting and exposure mechanism;
wherein the lighting and exposure mechanism, responsive to receiving the interrupt, turns on and off; and
wherein the pre-determined portion of the image data is determined by defining a threshold number of pixels per image block in the stat FIFO.

2. The system of claim 1, wherein the interrupt marks the start of a frame in a captured image and/or the end of a frame in a captured image.

3. The system of claim 1, wherein the image data is provided a raw image byte stream, a compressed image byte stream, and/or a partial compressed image byte stream.

4. The system of claim 1, wherein the interrupt is configured by vertical blank timing in the camera sensor interface.

5. The system of claim 1, wherein the pre-determined portion of the image data comprises one twelfth of a captured image.

6. The system of claim 1, wherein the lighting and exposure mechanism comprises an LED and an aimer.

7. The system of claim 1, wherein the image capture device comprises a camera and/or an optical scanner.

8. A method of utilizing a system comprising a camera sensor interface having a stat FIFO, the method comprising:
allocating blocks in the camera sensor interface's stat FIFO to receive image data when the system is utilized to capture an image;
determining a threshold number of pixels per allocated block;
configuring the stat FIFO to receive the threshold number of pixels of the image data per each of the allocated blocks;
configuring the stat FIFO to provide an interrupt each time the threshold number of pixels of image data is received by the stat FIFO, wherein the interrupt instructs a lighting and exposure mechanism to turn on or off; and
capturing an image.

9. The method of claim 8, wherein the lighting and exposure mechanism comprises an LED and an aimer.

10. The method of claim 8, wherein the image data is provided a raw image byte stream, a compressed image byte stream, and/or a partial compressed image byte stream.

11. The method of claim 8, wherein the threshold number of pixels of image data is reached 12 times while capturing an image.

12. The method of claim 8, comprising utilizing vertical blank timing in the CSI to time the lighting and exposure mechanism.

13. The method of claim 8, wherein the interrupt marks the start of a frame in a captured image and/or the end of a frame in a captured image.

14. The method of claim 8, wherein the system comprises a camera and/or an optical scanner.

15. A system, comprising:
an image capture device configured to capture an image and transmit image data, the image capture device comprising a camera and a lighting and exposure mechanism; and
a camera sensor interface configured to receive image data from the image capture device, the camera sensor interface comprising a stat FIFO;
wherein the stat FIFO is configured to:
receive image data from the image capture device; and
responsive to receiving a pre-determined portion of the image data, send an interrupt to the lighting and exposure mechanism;
wherein the lighting and exposure mechanism, responsive to receiving the interrupt, turns on and off; and
wherein the pre-determined portion of the image data is determined by defining a threshold number of pixels per image block in the stat FIFO.

16. The system of claim 15, wherein the interrupt marks the start of a frame in a captured image and/or the end of a frame in a captured image.

17. The system of claim 15, wherein the image data is provided a raw image byte stream, a compressed image byte stream, and/or a partial compressed image byte stream.

18. The system of claim 15, wherein the interrupt is configured by vertical blank timing in the camera sensor interface.

19. The system of claim 15, wherein the pre-determined portion of the image data comprises one twelfth of a captured image.

20. The system of claim 15, wherein the lighting and exposure mechanism comprises an LED and an aimer.

* * * * *